(12) United States Patent
Harjula et al.

(10) Patent No.: US 6,214,234 B1
(45) Date of Patent: Apr. 10, 2001

(54) METHOD FOR THE REMOVAL OF CESIUM FROM RADIOACTIVE WASTE LIQUIDS

(75) Inventors: Risto Harjula, Espoo; Jukka Lehto, Helsinki, both of (FI)

(73) Assignee: Ivo Power Engineering Oy, Ivo (FI)

( * ) Notice: Subject to any disclaimer, the term of this patent is extended or adjusted under 35 U.S.C. 154(b) by 0 days.

(21) Appl. No.: 09/202,453

(22) PCT Filed: Jun. 26, 1997

(86) PCT No.: PCT/FI97/00413

§ 371 Date: Dec. 15, 1998

§ 102(e) Date: Dec. 15, 1998

(87) PCT Pub. No.: WO97/50092

PCT Pub. Date: Dec. 31, 1997

(30) Foreign Application Priority Data

Jun. 26, 1996 (FI) .......................................... 962648

(51) Int. Cl.$^7$ ...................................... C02F 1/42

(52) U.S. Cl. ........................................ 210/682; 210/688

(58) Field of Search ................... 210/682, 688

(56) References Cited

U.S. PATENT DOCUMENTS

| | | | |
|---|---|---|---|
| 3,296,123 | * | 1/1967 | Prout et al. ............ 210/682 |
| 4,448,711 | | 5/1984 | Motojima et al. ....... 502/74 |
| 5,407,889 | | 4/1995 | Remes .................. 502/400 |
| 5,482,632 | * | 1/1996 | Lomasney et al. ....... 210/663 |
| 5,536,883 | * | 7/1996 | Le-Khac ............... 568/620 |

FOREIGN PATENT DOCUMENTS

| | | |
|---|---|---|
| A1 3704046 | 8/1988 | (DE) . |
| 2067743 | 8/1971 | (FR) . |

OTHER PUBLICATIONS

"Removal of Cesium From Nuclear Waste Solutions By Potassium Cobalt Hexacyanoferrate (II) Columns" by R. Harjula et al., Department of Radiochemistry, University of Helskinki, Helsinki, Finland.
Derwent's abstract, No. 82–43258E/21, week 8221, Abstract of SU, 850202 (Krylov V N), Jul. 30, 1981.

* cited by examiner

Primary Examiner—Ivars Cintins
(74) Attorney, Agent, or Firm—Birch. Stewart, Kolasch & Birch, LLP

(57) ABSTRACT

A method for removal of cesium from aqueous solution, particularly from nuclear waste liquids. The cesium-containing aqueous solution is contacted with a solid-state hexacyanoferrate compound of a transition element for binding cesium to the hexacyanoferrate. The aqueous solution of reduced cesium content is separated from the hexacyanoferrate. Preferably, a nickel or cobalt hexacyanoferrate is utilized having a fraction of exchangeable transition elements smaller than 35 %. The hexacyanoferrate compound of said transition element may be produced by slowly adding an aqueous solution of the hexacyanoferrate into the transition element salt solution, the concentration of the transition element salt solution being at least 0.35 mol/l, stirring the mixture at ambient temperature during the addition, and separating and recovering the resulting hexacyanoferrate precipitate from the mixture. This method has achieved volume reductions—that is, volume of cesium-containing waste liquid remaining in the ion-exchange column reduced from volume of cesium-containing aqueous solution treated—of as much as 9000 fold.

7 Claims, 1 Drawing Sheet

METHOD FOR THE REMOVAL OF CESIUM FROM RADIOACTIVE WASTE LIQUIDS

Figure 1:
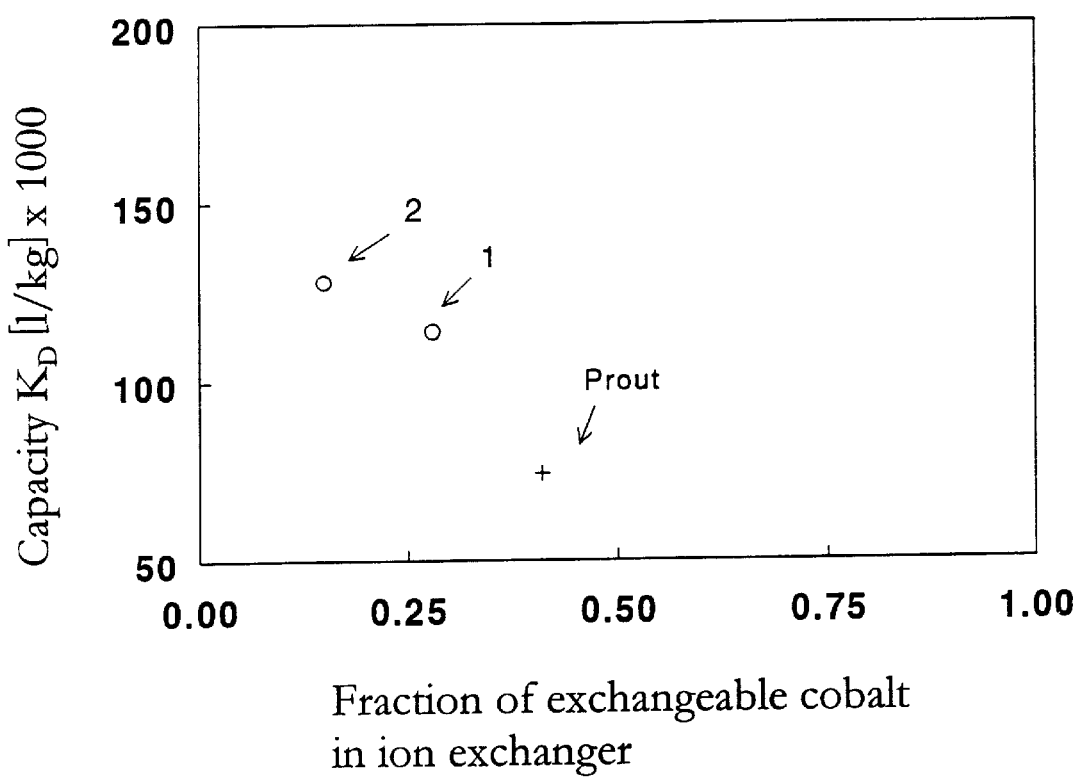

This application is the national phase under 35 U.S.C. §371 of prior PCT International Application No. PCT/FI97/00413 which has an International filing date of Jun. 26, 1997 which designated the United States of America.

The present invention relates to a method for cesium removal from aqueous solutions, particularly radioactive waste liquids.

According to the method, a cesium-containing aqueous solution is contacted in an ion-exchange column with a solid-state hexacyanoferrate compound of a transition series element for the purpose of binding cesium in the hexacyanoferrate, after which step the aqueous solution of reduced cesium content is separated from the hexacyanoferrate.

The present invention also concerns a method for industrial-scale production of granular hexacyanoferrate compounds of a transition metal suitable for use in a column. In the method, an aqueous solution of the soluble hexacyanoferrate is gradually added in a solution of a salt of the transition element with simultaneous stirring in order to produce a precipitate of the transition element hexacyanoferrate compound, after which the hexacyanoferrate precipitate thus formed is separated and recovered.

In the low- and medium-level radioactive waste solutions released by nuclear power plants and fissionable nuclear fuel reprocessing plants, $^{137}$Cs is generally the most important radioactive material owing to its relatively long half-life (30 a) and the large amounts of this isotope formed in a fission reaction. Removal of cesium from radioactive waste liquids makes the treatment of remaining solutions much easier. Particularly, if a major portion of the radioactivity of high-level solutions can be separated from the bulk of the solution into a small-volume batch and thereafter the remaining solution treated as a medium- or low-level waste, extremely large cost savings are possible. In some cases, the waste liquids of nuclear plants may after cesium removal even be discharged to the environment owing to their very low residual radioactivity after this separation stage. The primary goal of separating radionuclides from radioactive waste liquids is to reduce the volume of such wastes, whereby the handling and permanent repository costs of the wastes are lowered. The more selective, i.e., the more specific the separation method with respect to given radioactive material as compared to other substances in the solution, the higher the volume reduction achievable by the method. Another goal of separation of radionuclides is to reduce the amounts of effluents to the environment, which can be rendered economically viable by selective separation methods.

For the removal of radioactive cesium from radioactive waste liquids, either precipitation or ion-exchange methods have been used. Precipitation does not provide as high a degree of separation as ion exchangers and often it is difficult to effectively separate the precipitated solids from the solution. Most generally, organic ion-exchange resins have been used as ion exchangers adapted for cesium removal, and since the late 1980's, also zeolite minerals have been used to an increasing degree (cf. Lehto 1993a).

Already for decades, hexacyanoferrates of transition elements have been known to be superior to organic resins and zeolites in cesium-binding ion exchangers (cf. Loewenschuss 1982, Hendrickson 1975). Table 1 shows the higher efficiency of, e.g., potassium-cobalt hexacyanoferrate in comparison to zeolites and organic resins or ammonium phosphomolybdate, the latter being recognized as an efficient ion exchanger of cesium (cf. Lehto 1993b). No practical usability have been found for zeolites and organic ion-exchange resins in the removal of cesium from, e.g., concentrated NaNO$_3$ solutions of nuclear fuel reprocessing plants and waste liquid evaporation residues of nuclear power plants.

TABLE 1

Distribution coefficients of radioactive cesium for different ion exchanger materials in 1M KCl and NaCl solutions. The value of the distribution coefficient indicates the waste-handling capacity of a column exchanger, i.e., how many liters of solution can be processed by a 1 kg batch of the ion-exchange material.

| | Distribution coefficient | |
|---|---|---|
| Exchanger | 1M KCl | 1M NaCl |
| K—Co hexacyanoferrate | 50,000 ml/g | 200,000 ml/g |
| Ammonium phosphomolybdate | 2,500 | 100,000 |
| Zeolite (mordenite) | 60 | 570 |
| Sulfonic acid resin | 0 | 10 |

The composition of hexacyanoferrates of transition elements is represented by the formula $$A_xM_y[MFe(CN)_6] \cdot zH_2O$$

where A is either an alkali metal ion or ammonium ion and M is a transition element with valence 2, such as Ni or Co. The ions written within the square brackets form a crystalline structure with a negative total charge −2, and the ions of positive total charge written outside the square brackets are situated in the channels of the crystalline structure, wherefrom they can be replaced by the ions, such as Cs, of the external solution.

Ion exchange of cesium using hexacyanoferrates is represented by the formula:

$$A_xM_y[MFe(CN)_6] + 2Cs^+ \approx Cs_2[MFe(CN)_6] + xA^+ + yM^{2+}$$

where $x + y/2 = 2$.

Up to date, hexacyanoferrates have been used as precipitation reagents for removal of cesium from the waste liquids of reprocessing plants. Columns are known, however, to provide a much higher degree of separation and simpler process than direct use of precipitation reagents. This is also verified in the literature: cesium removal in a column packed with granular hexacyanoferrate is around hundred times more efficient than precipitation with a corresponding amount of hexacyanoferrate when separation efficiency is indicated as a product of the decontamination factor (ratio of pretreatment radioactivity to posttreatment radioactivity) and the volume reduction factor (Harjula 1994). Yet, use of hexacyanoferrates in columns has been ignored in the nuclear industry. The most important obstacle has been the poor quality of ion-exchange materials; the granular particles of tested hexacyanoferrate grades have undergone disintegration, thereby plugging the column. In fact, the inventors of the present method found in the late 1980's that the potassium-cobalt hexacyanoferrate grade which at that time was commercially available from a single manufacturer alone disintegrated into useless sludge in water.

While a number of different methods have been developed for the production of hexacyanoferrate grades suitable for column use through binding the ion-exchange compound on, e.g., organic ion-exchange resins (cf. Narbutt, Stejskal 1974, Watari 1965, Lehto 1993c), none of these products has, however, been adopted in industrial use. Hexacyanoferrates bound on organic ion-exchange resins exhibit an extremely reduced resistance to high radiation doses, which limits their binding capacity to relatively small amounts of separated $^{137}$Cs (cf. Lehto 1993d).

U.S. Pat. No. 3,296,123 (Prout 1967) discloses a method of producing potassium-cobalt hexacyanoferrate, in which method an aqueous solution of potassium ferrocyanide trihydrate is buffered at pH 5.3 with a mixture of acetic acid and sodium acetate, after which the solution is slowly added at a temperature below 15° C. into an aqueous solution of a cobalt salt under continuous stirring. The precipitate thus obtained is recovered and dried at an elevated temperature to make crystalline potassium-cobalt hexacyanoferrate. According to cited publication, the cobalt salt is used by an excess amount of 40–50% with respect to said ferrocyanide compound in order to prevent the formation of colloidal or difficult-to-centrifuge products.

The prior-art method makes it possible to produce an ion-exchange material that functions satisfactorily also in a column at least in laboratory equipment scale. However, the distribution coefficient of the product remains rather low due to the relatively high cobalt content of the product; this is because the fraction of cobalt in the amount of exchangeable ions have been found to bear a direct detrimental effect on the cesium removal capability of the compound. Other disadvantages of this prior-art method obviously can be seen in the buffering step which makes the process more complicated and the requirement of carrying out the reaction and washing steps at a temperature below 15° C., which elevates the equipment and operating costs of the process.

It is an object of the present invention to overcome the drawbacks of conventional techniques and to provide an entirely novel approach to the removal of cesium from aqueous solutions such as nuclear waste liquids.

The goal of the invention is achieved by virtue of producing a granular product extremely well suited for column use by adding ferrocyanide in a solution of a transition metal compound having so high a concentration that the crystalline hexacyanoferrate thus formed has the equivalent fraction of exchangeable transition elements in the total amount of exchangeable ions smaller than 35%, advantageously smaller than 30% and maximally about 28%, particularly advantageously maximally about 15%. To this end, the concentration of the soluble transition metal salt in the solution is advantageously at least 0.35 mol/l, most advantageously from about 0.4 mol/l to almost the concentration of a saturated solution.

The addition of hexacyanoferrate and precipitation of the product can be made at ambient temperature (about 20° C.) without any buffering.

The invention makes possible to produce granular transition element hexacyanoferrate with a particle diameter of 0.1–2 mm, advantageously 0.3–0.85 mm. The product can be used in ion-exchange columns for recovery of cesium from aqueous solutions. Herein, the decontamination factor of a column packed with hexacyanoferrate granular particles becomes at least 1,000, in advantageous cases even greater than 5,000. Binding of cesium in an ion-exchange column makes it possible to reduce the volume of cesium-containing waste liquids typically by a factor of several thousands, even more than 10,000-fold, depending on the composition of the liquid being treated.

More specifically, the method according to the invention for removal of cesium from aqueous solutions is principally characterized by using a nickel or cobalt hexacyanoferrate having a fraction of exchangeable transition elements smaller than 35%.

Furthermore, the method according to the invention for producing a transition element hexacyanoferrate suitable for column use is characterized in that the transition element used is nickel or cobalt the concentration of said transition element salt solution is at least 0.35 mol/l, and the mixture of said hexacyanoferrate compound and said transition element salt is stirred at ambient temperature during said addition step of the solutions.

The method according to the invention for producing a granular transition element hexacyanoferrate compound suitable for column use from soluble hexacyanoferrate and a transition element salt comprises the following steps:

slow addition of aqueous solution of soluble hexacyanoferrate into a solution of a salt of a transition element with simultaneous stirring of the mixture under ambient temperature, the hexacyanoferrate precipitate thus formed is washed a number of times by slurrying the precipitate in water, the hexacyanoferrate precipitate is separated from the aqueous phase by centrifuging after each washing step, the precipitate is dried at an elevated temperature, and the dried product cake is crushed and product particles of desired size are recovered by screening.

As the soluble hexacyanoferrate, i.e., the ferrocyanide compound, the method most advantageously uses sodium, potassium or ammonium hexacyanoferrate, of which potassium hexacyanoferrate is considered particularly advantageous. Further, the salt of the transition metal is selected from the group of nitrate, sulfate or chloride salts, and the transition element is most advantageously nickel or cobalt, of which the latter is considered particularly advantageous. The concentration of the transition element salt solution is at least about 0.35 mol/l and can be elevated to the concentration level of an almost saturated aqueous solution. The concentration of a saturated aqueous solution of a transition element salt is dependent on the transition metal species and the counterion. In the following are listed concentrations of certain saturated solutions at 20° C., whereby the concentrations given herein also represent the advantageous concentration upper limit of the transition metal salt solution used in the method according to the invention:

| | |
|---|---|
| $CoSO_4 \times 7H_2O$ | 1.30M |
| $Co(NO_3)_2 \times 6H_2O$ | 3.44M |
| $CoCl_2 \times 6H_2O$ | 2.22M |
| $NiSO_4 \times 7H_2O$ | 1.32M |
| $Ni(NO_3)_2 \times 6H_2O$ | 3.31M |
| $NiCl_2 \times 6H_2O$ | 2.32M |

The concentration of saturated aqueous solution of potassium hexacyanoferrate is 0.68M and that of sodium hexacyanoferrate is 0.37M.

When the transition metal salt is cobalt sulfate and the soluble ferrocyanate is the potassium salt thereof, the concentration of the transition element salt at 20° C. is advantageously in the range 0.4–1.3 mol/l and the concentration of the hexacyanoferrate compound is about 0.4–0.65 mol/l. The higher the total salt content of the solution, the lower the fraction of detrimental exchangeable cobalt in the ion-exchange material.

The aqueous solution of the hexacyanoferrate compound is added with simultaneous stirring into the aqueous solution of the transition metal salt. With respect to the added hexacyanoferrate, an at least equimolar amount of the transition metal salt shall be used, and most advantageously a 30–50% excess of the transition metal salt is used. Rather good results are obtained at a 40% excess. The addition step is performed at "prevailing" temperature, which means that the process can be carried out at ambient temperature without the need for any particular temperature control arrangement. Typically the process temperature is above 15° C. but less than 30° C., and particularly advantageously the process is carried out in the temperature range 18–25° C. (i.e., at room temperature).

After the addition of the hexacyanoferrate solution, stirring is continued for some time in order to complete the reaction of the reagents, then the mixture is allowed to stand still, whereby the precipitate settles only partially. Preferably, the precipitate is separated by centrifuging. Next, the precipitate is washed from 2 to 6 times, typically 3 or 4 times with water. The present method can use normal tap water at a typical temperature of about 10° C. The water may also be at room temperature. After washing, the precipitate is separated by centrifuging. Washing and subsequent pressing may also be carried out using a filter press.

The filter cake thus obtained is dried at an elevated temperature. The drying temperature is preferably above 100° C., in particular about 105–150° C., but not above 200° C.

According to the invention, the dried filter cake can be predisintegrated prior to the actual crushing step by immersing the cake into water immediately after drying, whereby the fraction of fine solids in the end product is drastically reduced. Herein, the filter cake disintegrates in water into agglomerate particles of suitable size which can then be recovered and subjected to further processing. The fine solids are separated away.

The agglomerate particles are dried, crushed and screened, whereby the end product is granular material with a diameter of 0.1–2 mm, advantageously 0.3–0.85 mm.

If the transition element is cobalt and the alkali metal is potassium, the above-described process yields a potassium-cobalt hexacyanoferrate product in which the fraction of exchangeable cobalt is smaller than 35%, typically below 30%. According to a preferred embodiment of the invention, however, the fraction of exchangeable cobalt can be essentially reduced by washing the product with an aqueous solution of an alkali metal-EDTA complex. Particularly advantageously is used a K-EDTA solution with a molar concentration most appropriately in the range from about 0.001 to about 0.01 mol/l. Advantageously, the amount of the solution used is about 1–100 l/kg of washed product. Washing and subsequent drying is carried out in the above-described manner. By virtue of the K-EDTA washing, the fraction of exchangeable cobalt in the product can be halved under optimal conditions.

The present invention makes it possible to provide a granular ion-exchange material of superior performance in columns. Using a cesium removal system based on hexacyanoferrate produced according to the invention, a full-scale process running at a nuclear power plant has shown industrial benefits in the form of much higher cesium removal efficiencies and waste volume reduction factors than those offered by any other practicable cesium removal method. The hexacyanoferrate product developed in the invention has also been applied successfully to large-scale separation of other radioactive waste liquids.

In regard to the closest conventional technology, i.e., the above-described methods disclosed by Prout, the following benefits and others are achieved (as compared to the products prepared in the examples described below and the results thereof, which are compared to the data given in U.S. Pat. No. 3,296,123):

The method disclosed by Prout uses a cobalt salt solution of lower concentration, which necessitates a larger volume of the solution and resultingly an about 40% larger mixing vessel size as compared to the present invention. Even more important is the particular benefit of the present invention that the concentration of potassium ions in the reaction mixture becomes higher, whereby the fraction of exchangeable potassium in the ion exchanger is increased with respect to the exchangeable cobalt. The composition of the hexacyanoferrate made according to Prout's patent (cf. example described below) was $Na_{0.33}K_{1.52}Co_{0.41}[CoFe(CN)_6]$ (fraction of exchangeable cobalt being about 35%), while the composition of the product made according to the present invention is, e.g., $K_{1.70}Co_{0.28}[CoFe(CN)_6]$, whereby the fraction of exchangeable cobalt is about 25% (Product 1, cf. Example 1 below). As noted above, high fraction of cobalt in the exchangeable ions has a direct detrimental effect on the cesium removal capability of the product. This phenomenon is plausibly caused by the fact that exchangeable Co is bonded extremely strongly in the ion exchanger and, according to our tests, its removal by ion exchange from the ion-exchange material is very difficult by means of, e.g., even the most concentrated sodium and/or potassium salt solutions. Ion exchange of cesium with cobalt is more difficult than, e.g., sodium or potassium. Therefore, a lower amount of exchangeable cobalt increases the Cs exchange capacity of hexacyanoferrates. The same fact is also evident from our comparative test, which indicated that under the same conditions (using a simulated waste liquid evaporation residue prepared using 1.5M $NaNO_3$, 0.2M $KNO_3$, 0.4M $Na_2B_4O_7$, pH 11.5), the distribution coefficient of the product made according to Prout's method was 74,000 ml/g, while the novel product (Product 1) described below achieves as high a value as 114,000 ml/g.

Since the distribution coefficient is directly proportional to the capacity of the ion-exchange material in column use, the product of our invention provides a 1.5-fold capacity improvement in the above-mentioned case. Also in a simulated high-level waste solution (containing 0.66M NaOH, 2.0M $NaNO_3$, 1.6M $NaNO_2$, 0.5M $Na_2CO_3$, $Al_2Cl_3$, $Na_2SO_2$, 0.03M $KNO_3$, 0.0003M CsCl), the product of our invention was clearly better with a distribution coefficient of 15,100 ml/g (Product 1, Example 1) vs. 5,700 ml/g (Prout, Comparative example).

The lower exchangeable amount of cobalt in Product 1 with respect to Prout's product results therefrom that the synthesis of the present invention uses a Co salt solution of higher concentration, and particularly in Product 2 (cf. Example 2) therefrom that the exchangeable cobalt is additionally washed away from the product with a potent EDTA complexing agent. In the latter example, the product composition was analyzed as $K_{1.75}Co_{0.15}[CoFe(CN)_6]$ (corresponding to a 15% fraction of exchangeable cobalt). The distribution coefficient of the novel product determined using the above-described simulated evaporation waste liquid is 128,000 ml/g, which means a 1.7-fold capacity improvement over Prout's product.

In the method of the present invention, the washing steps can be performed with tap water without any temperature control, whereas the method disclosed by Prout needs cooled water (+5° C.) for the washings.

In the present method, the dried cake is predisintegrated by immersing the cake in water, whereby the pulverized fine particles detrimental in column use are reduced appreciably during this step that is lacking in Prou's method.

Most of these benefits are particularly significant in large-scale production of the ion-exchange material. The capacity improvement (50–70% in evaporated waste liquid and 160% in high-level waste liquid) achieved by the present invention in waste handling efficiency over Prout's product is also significant in the perspective of the extremely high final destination costs of exhausted ion-exchange materials.

In the following, the invention will be examined with the help of a detailed description and a number of exemplifying embodiments illustrated in the appended drawing in which FIG. 1 shows the capacities of Products 1 and 2 as well as that of Prout's product for a simulated evaporated waste liquid as a function of the relative amount of cobalt in the ion-exchange material.

EXAMPLE 1

Preparation of Granular Hexacyanoferrate for Column Use

In the example, 100 l of 0.5M $K_4Fe(CN)_6$ was added during 30 min into 140 l of 0.5M $CoSO_4$ with continuous stirring of the mixture. After the addition, the stirring was continued for 5 min. The reaction temperature was 20° C. The mixture was allowed to settle overnight, then centrifuged, after which the separated hexacyanoferrate precipitate was washed four times by slurrying in tap water. The ion-exchange material was separated in each washing step by recentrifuging. The ion-exchange material was next dried as a 5 cm thick cake for 48 h at 110° C. After cooling, the dried cake was immersed in water, whereby, the cake disintegrated into relatively large clumps of varying size. After drying, the clumps were crushed and the granular particles of desired size were recovered by screening. The granular particles were washed to remove pulverized fine solids and dried overnight at 110° C.

The synthesis according to the above-described example yielded a product (Product 1) with a composition $K_{1.70}Co_{0.28}[CoFe(CN)_6]$.

EXAMPLE 2

Modification of Granular Hexacyanoferrate for Column Use

A portion of the exchangeable Co-ions can be removed by treating the granular product prepared according to the above example with a potassium complex (K-EDTA) of ethylenediaminetetraacetic acid (EDTA), whereby the ion-exchange capacity of the material can be improved.

The treatment is carried out as follows: Product 1 is stirred in 0.01 mol/l K-EDTA solution for 30 min, whereby the appropriate mixing ratio is 10–20 l of the solution per 1 kg of the product. After stirring the granular particles are washed with water and dried at 110° C. for 16 h. The product (Product 1) resulting from the treatment had a composition $K_{1.75}Co_{0.15}[Fe(CN)_6]$. Herein, the K-EDTA concentration may not be greater than 0.01 mol/l, because otherwise EDTA can remove Co ions bound in the crystalline structure, whereby the ion exchange material will undergo partial dissolution.

Comparative Example

The product of Prout's invention was prepared according to the disclosed method (Prout W.E. et al.) and the resulting product was analyzed to have a composition $Na_{0.03}K_{1.52}Co_{0.41}[CoFe(CN)_6]$. The product was found to contain trace amounts of sodium, because it was prepared in Na-acetate buffer solution as required by the Prout method.

EXAMPLE 3

Use of Potassium-cobalt Hexacyanoferrates in Cesium Removal

Potassium-cobalt hexacyanoferrate products prepared according to Example 1 were tested first in laboratory-scale 2 ml columns, then in pilot-scale 150 ml columns and finally in a full-scale process. The process was employed for cesium removal from so-called waste liquid evaporation residues having an extremely high pH (about 14) and salt content (e.g., 3–4 mol Na/l).

The full-scale process was carried out using steel columns of 8 l volume packed with granular potassium-cobalt hexacyanoferrate. The solution is pumped through the columns, whereby cesium sorbed in the column packing material.

The first full-scale test run resulted in 99.95 % trapping of cesium in the column after a single 8 l column had been used for treating 183 $m^3$ of the solution. As the extremely low residual radioactivity ($^{60}Co$) of the passed solution permitted its release in the sea, the effective volume reduction of the waste liquid became 23,000-fold (computed as volume reduction ratio 183,000 l/8 l ).

So far, the present method has been used for treating an overall volume of about 700 $m^3$ waste liquid in ten columns of 8 l volume, whereby the effective volume reduction was about 9,000-fold. After the process, the cesium-containing columns are transferred as such to their site of permanent disposal after packing the columns in a concrete casks of 1.7 $m^3$ volume, 12 columns in each cask. Conventionally, waste solutions such as waste liquid evaporation residues are solidified for their permanent disposal by immobilizing the waste in concrete, which increases the permanent disposal volume of the waste by a factor of about 3. The present method has been estimated to give a saving of almost USD 10,000 per each treated cubic meter of waste liquid in the waste handling and storage repository costs.

When cesium is removed from high-level waste liquids, direct storage of cesium-containing columns in concrete casks is not possible, but instead the used hexacyanoferrate must be bound in vitrified for the permanent disposal. Although the vitrification of the present product has not been investigated systematically, such a process is plausibly feasible. Potassium-cobalt hexacyanoferrate disintegrates under heating into the following oxides compatible with vitrification: $Fe_2O_3$, CoO and $K_2O$ (Lehto 1990), without the risk of releasing toxic cyanide-containing gases during heating (Lehto 1995).

EXAMPLE 4

Product 1 and Product 2 were tested for the removal efficiency of radioactive Cs in batch and column use, and the results were compared to the efficiency of product made in the comparative test according to the Prout method.

In batch tests, the distribution coefficient $K_D$ was determined for $^{134}Cs$ isotope in simulated waste liquids using Product 1, Product 2 and the product made according to Prout. In the tests, the ion exchanger was allowed for 3 days to reach equilibrium with the solution with the ratio of the ion-exchange material mass to the liquid volume set at 100 ml/g. After equilibration, the solution was centrifuged at 60,000 rpm for 60 min and filtered through a 10,000 kD membrane prior to the $^{134}Cs$ activity measurement. The distribution coefficient $K_D$ indicates directly the maximum capacity of the ion exchanger as the liquid volume (ml) that can be treated with a given mass (g) of the ion-exchanger material.

In the following, the results of the comparative tests are given:

Simulated Evaporation Residue of Nuclear Power Plant Waste Liquid

In simulated evaporation residue of the waste liquid (having the composition given in Table 2) of a nuclear power plant located in Loviisa, Finland, the measured distribution coefficients (given in Table 3) indicate that Product 1 ($K_D$=114,000 ml/g) provided an about 55% higher capacity than Prout's product ($K_D$=74,000 ml/g). Product 2 ($K_D$=128,000 ml/g) offered a capacity improvement of 73%.

TABLE 2

Composition of simulated waste liquid evaporation residue at Loviisa nuclear power plant.

| Compound | Concentration (g/l) |
|---|---|
| $NaNO_3$ | 127.5 |
| $KNO_3$ | 20.0 |
| $Na_2B_4O_7$ | 95.0 |
| pH | 11.5 (adjusted with $HNO_3$) |
| $^{134}Cs$ marker | 10 µCi/L |

TABLE 3

Distribution coefficient $K_D$ of $^{134}Cs$ for different ion-exchange materials in simulated waste liquid evaporation residue of Loviisa nuclear power plant.

| Product | $K_D$ (ml/g) |
|---|---|
| 1 | 114,000 + 3,000 |
| 2 | 128,000 + 5,000 |
| Prout | 74,200 + 11,300 |

Simulated High-level Radioactive Waste Liquid

In simulated high-level radioactive alkaline waste liquid (having a composition given in Table 4), the distribution coefficients (given in Table 3) show that Product 1 ($K_D$=15,100 ml/g) provides a capacity improvement of about 160% over Prout's product ($K_D$=5,650 ml/g).

TABLE 4

Composition of simulated high-level radioactive waste liquid.

| Compound | Concentration (mol/l) |
|---|---|
| NaOH | 0.66 |
| $NaNO_3$ | 2.00 |
| $NaNO_2$ | 1.60 |
| $Na_2CO_3$ | 0.50 |
| $Al_2Cl_3$ | 0.08 |
| $Na_2SO_2$ | 0.20 |
| $KNO_3$ | 0.03 |
| CsCl | 0.0003 + $^{134}Cs$ marker |

TABLE 5

Distribution coefficient $K_D$ of $^{134}Cs$ for different ion-exchange materials in simulated high-level radioactive waste liquid.

| Product | $K_D$ (ml/g) |
|---|---|
| 1 | 15,100 + 300 |
| Prout | 5,650 + 120 |

EXAMPLE 5

In addition to the successful applications of the hexacyanoferrate according to the present invention in industrial-scale removal of cesium, it has been found in laboratory-scale tests to perform as well excellently in a variety of solutions, a few examples of which are described below:

1. A simulated waste liquid of a reprocessing plant having a high salt content, said liquid containing 250 g/l $NaNO_3$ at pH 10. The liquid was pumped through the column up to 4,000 column volumes, after which the test was interrupted. No break-through of cesium was detected and decontamination factor computed from the determination limit was not less than 15,000.

2. A simulated decontamination waste liquid of medium-strong salt concentration, said liquid containing 5 g/l of $NaNO_3$, 0.05 g/l of Na-oxalate, 0.05 g/l of nitrilodiacetic acid and 0.05 g/l of Na-polyphosphate adjusted at pH 10. Even after the liquid was pumped through the ion exchanger for 4,200 column volumes, no break-through was detected when the test was terminated. The decontamination factor was found to be in the range 1,000–3,000.

3. A simulated nuclear power plant waste liquid of low salt concentration, said liquid containing 0.32 g/l of $NaNO_3$ and 0.017 g/l of Ca adjusted at pH 6. Even after the liquid was pumped through the ion exchanger for more than 50,000 column volumes, no break-through was detected. The decontamination factor was found to be in the range 2,000–20,000.

REFERENCES:

Harjula, R., Lehto, J., Tusa, E. and Paavola, A., 1994, Nucl. Technol. 107(1994)272.
Hendrickson, W. F. and Riel, G. K., 1975, Health Phys. 28(1975)17.
Narbutt, U.S. Pat. No. 4,755,322.
Lehto, J., Haukka, S., Koskinen, P. and Blomberg, M., Thermochim. Acta 160(1990)434.
Lehto, J., 1993 a, Ion Exchange Processes: Advances and Applications, Proc. of ION-EX'93, Royal Society of Chemistry, 1993, p. 39.
Lehto, J., Harjula, R., Tusa, E. and Paavola, A., 1993b, Proc. of the 1993 Int. Conf. on Nuclear Waste Management and Environmental Remediation, Prague, September 5–11, 1993. Vol. 3, p. 763.
Lehto, J., Harjula, R., Haukka, S. and Kattainen, R., 1993c, Fl Pat. No. 87,998 (1993).
Lehto, J. and Szirtes, L., 1993c, Radiat. Phys. Chem. 43(1993)261.
Lehto, J., Pettersson, M., Hinkula, J., Räsänen, M. and Elomaa, M., Thermochim. Acta 265(1995)25.
Loewenschuss, H., 1982, Radioact. Waste Manag. 2(1982) 327.
Prout, W. E., Russell, E. R. and Groh, H. J., 1967, U.S. Pat. No. 3,296,123 (1967).
Stejskal, J. et al, 1974, J. Radioanal. Chem. 21(1974)371.
Tusa, E., Paavola, A., Harjula, R. and Lehto, J., 1994, Nucl. Technol. 107(1994)279
Watari, K. et al., 1965, J. Nucl. Sci. Technol. 2(1965)321.

What is claimed is:

1. A method for removal of cesium from an aqueous solution said method comprising the steps:

(A) slowly adding an aqueous solution of a hexacyanoferrate salt into a nickel or cobalt salt solution, the concentration of the nickel or cobalt salt solution being at least 0.35 mols per liter, and stirring the mixture at ambient temperature during this addition, to provide a nickel or cobalt hexacyanoferrate having a fraction of exchangeable nickel or cobalt smaller than 35%;

(B) separating and recovering the resulting hexacyanoferrate precipitate from the mixture to provide a solid-state hexacyanoferrate compound;

(C) contacting the cesium-containing aqueous solution with said solid-state hexacyanoferrate compound for binding cesium to the hexacyanoferrate; and (D) separating the aqueous solution of reduced cesium content from the hexacyanoferrate.

2. The method according to claim 1, wherein the fraction of exchangeable nickel or cobalt of the hexacyanoferrate compound is smaller than 28%.

3. The method according to claim 1, wherein said solid-state hexacyanoferrate compound is in the form of granular material particles with a diameter of 0.3–0.85 mm.

4. The method according to claim 3, wherein the cesium-containing aqueous solution is contacted with the granular particles of said hexacyanoferrate compound in an ion-exchange column.

5. The method according to claim 4, wherein a decontamination factor of said column is at least 1,000.

6. The method according to claim 4, wherein the volume of the cesium-containing waste liquid remaining in the ion-exchange column is reduced at least by a ratio 1,000:1 with respect to the volume of the cesium-containing aqueous solution treated in step (C).

7. The method according to claim 1, wherein the transition element in said nickel or cobalt hexacyanoferrate compound is cobalt.

* * * * *